United States Patent Office 3,253,021
Patented May 24, 1966

3,253,021
3,4-DIHALO-N-ACYLPHENYLHYDROXYLAMINES
Jerome Linder, Niagara Falls, and Edward D. Weil, Lewiston, N.Y., assignors to Hooker Chemical Corporation, Niagara Falls, N.Y., a corporation of New York
No Drawing. Filed Apr. 17, 1961, Ser. No. 103,266
5 Claims. (Cl. 260—500)

This invention describes novel organic compositions of matter useful as selective post-emergence herbicides. More particularly, this invention concerns a series of selective post-emergence herbicides, the 3,4-dihalo-N-acylphenylhydroxylamines alternatively called the N-(3,4-dihalophenyl)-acylhydroxamic acids, which have not been previously described in the literature. The scope of the inventive concept intended to be covered is indicated by the structural formula below:

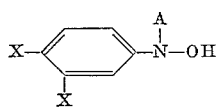

where A is an organic radical selected from aliphatic acyl radicals having three to six carbon atoms and having at least one methyl group in the alpha position, and X is an element selected from the group consisting of halogen, preferably chlorine.

Illustrative compounds intended to be within this invention include among others, 3,4-dichloro-N-propionylphenylhydroxylamine, 3,4 - dibromo-N-propionylphenylhydroxylamine, 3,4 - dichloro-N-isobutyrylphenylhydroxylamine, 3,4-dibromo-N-isobutyrylphenylhydroxylamine, 3,4-dichloro-N-methacrylylphenylhydroxylamine, 3,4-dibromo-N-methacrylylphenylhydroxylamine, 3,4-dichloro-N-(2-methylbutanoyl)phenylhydroxylamine and 3,4-dichloro-N-(2-methylpentanoyl)phenylhydroxylamine.

One of the herbicidal problems upon which a great deal of time and effort has been unsuccessfully expended is to find a selective herbicide capable of controlling weeds post emergence in broad-leaf (dicotyledonous) crops such as cabbage, cotton, soybeans, potatoes, tomatoes, carrots, etc., without harming the crops themselves. Initially, it was hoped that 2,4-dichlorophenoxyacetic acid (2,4-D), a selective herbicide against weeds post-emergence in grassy (monocotyledonous) crops would prove to be satisfactory, but due to 2,4-D's relatively high phytotoxicity to broad-leaf crops this has rarely been possible. Even with certain grassy crops such as rice, 2,4-D has been unsatisfactory, since it fails to control the major grassy weeds. Some good results have been obtained using herbicides in oil where herbicides resistant to broad-leaf crops such as carrots are involved but the ordinary broad-leaf crop is too severely damaged and most farmers have resigned themselves to the safe but more time consuming, tedious and expensive hand weeding and mechanical cultivating.

Thus, the inventive discovery of a novel selective herbicide series of compounds possessing high phytotoxicty toward weeds after emergence and low phytotoxicity against broad-leaf crops and certain grassy crops offers the advantage of dispensing with the more expensive laborious hand and machine cultivating and at the same time produces higher yields of the sought crop.

While selectivity and low phytotoxicity toward broad-leaf crops is an important attribute possessed by the inventive compositions, there are equally important additional advantages some of which will be disclosed for the sake of illustration.

An additional advantage of the compounds of the invention is that they have sufficient selectivity when used at the preferred rates, to control weedy grasses such as crabgrass and barnyard grass post-emergence in the presence of certain desirable grasses such as bluegrass, ryegrass, other turf grasses, as well as rice and sugar cane, without serious damage to these crops.

Yet another advantage of the novel compositions of this invention is that they may be used in grades of purity ranging from the crystalline to a technical crude. Furthermore, these novel herbicidal compositions offer the advantage of compatability with a host of other herbicides including the herbicidal oils, with fungicides such as the metal dimethyldithiocarbamates and ethylenebis-(dithiocarbamates), with insecticides such as benzene hexachloride and chlordane, with fertilizers such as urea and ammonium nitrate, and various adjuvants and diluents well known to the art. Thus, these herbicides may be used by themselves or made the subject of liquid or solid formulations ranging from the very simple to the very complex. For example, if it is desired, these compositions may be made the subject of a liquid formulation by diluting, dispersing, dissolving or emulsifying in a liquid carrier containing a surface active or dispensing or emulsifying adjuvant or a combination of these adjuvants in water or organic solvents such as petroleum hydrocarbons, alcohols, ketones, esters, glycols or combinations thereof. Or alternatively, the novel herbicides may be made up as solid formulations of powders, dusts, wettable dusts, granules and pellets using solid diluents such as talcs, clays, flours, starches, diatomaceous earths, mica, alkaline earth, carbonates and phosphates either finely divided, granular or pelleted in form.

These solid and liquid formulations facilitate handling and application and sometimes enhance herbicidal activity to more than an additive degree.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. By the term surface active agents are included wetting agents, dispersing agents, emulsifying agents and the like. A satisfactory but not complete list of such agents is set forth in an article in "Soap and Chemical Specialties," vol. 31, No. 7, pages 50–61; No. 8, pages 48–61; No. 9, pages 52–67, and No. 10, pages 38 (67), 1955. Other sources of adjuvant materials is set forth in Bulletin E–607 of the Bureau of Entomology and Plant Quarantine of the United States Department of Agriculture.

While the manner and method of application of the inventive compositions is varied and largely dependent upon the climatic conditions, crop treated, the weeds to be eradicated, the equipment available and the convenience of the user, a preferred embodiment of this invention is to apply these herbicides as a spray after making them up as a liquid formulation comprised of several times their weight of non-phytotoxic solvents such as xylene with small quantities of emulsifiers such as the commercial polyoxyethylene ethers and the alkylaryl sulfonates. This mixture is emulsified with water and sprayed on the weed population growing amidst the desired crop such as soybeans, cabbages, potatoes, tomatoes, rice, carrots, turf grasses, etc.

The rate of application cannot be precisely stated due to varying degree of resistance possessed by the weed species and crop, the stage of weed and crop growth, the soil type and climatic conditions, but in general, the rates will be at least one-quarter of a pound of herbicide per acre and for reasons of cost will seldom exceed forty pounds per acre with the preferred range falling within one-half to ten pounds per acre. Where the weeds are in an early stage of growth, and consequently are more susceptible, they will frequently respond to the rates from one-half to four pounds per acre, while older weeds or weeds that are to be totally eradicated from ornamental beds or turf may require rates in excess of twenty pounds per acre.

The compounds of this invention may conveniently be prepared by treating 3,4-dichlorophenylhydroxylamine or its salts, which are well known compounds with one mole or less of an acylating agent represented by propionyl, isobutyryl, methacryl or a mixture thereof. Suitable acylating agents include the acyl halides, anhydrides or the generally slower reacting esters. While catalysts are not essential to the success of the preparative reaction, where the acylating agent is the halide or the anhydride, the presence of an acid acceptor such as a tertiary amine or inorganic base is helpful in speeding up the reaction and insuring that the reaction goes to completeness. The free OH group imparts a slight acidity to the inventive compositions which enables the preparation of the metal salts by reaction with a strong base. Typical salts which may be produced by this method are the alkali and alkaline earth metal salts as well as the ammonium and substituted ammonium salts. These salts are useful as a convenient means of formulating the inventive compounds as well as imparting special characteristics such as time of herbicidal duration, solubility and the like.

In order to better illustrate the workings of this invention the following examples are given. These examples illustrate the preparation of some of the inventive compositions, formulations used and the testing procedure used to evaluate the worth of the compositions as herbicides.

*Example 1.—Preparation of 3,4-dichloro-N-propionylphenylhydroxylamine*

In an appropriate reaction flask is placed a solution consisting of one mole of 3,4-dichlorophenylhydroxylamine, one mole of triethylamine in six hundred milliliters of dry benzene. The solution is cooled to fifteen degrees centigrade, and nitrogen under positive pressure is applied to the reactor. To this solution is added slightly less than one mole of propionyl chloride at a sufficient rate so that the reaction temperature does not rise above twenty degrees centigrade. The reaction mixture is stirred for an additional two hours and filtered. The filter cake is washed with benzene and discarded. The filtrate is washed with dilute hydrochloric acid, water, sodium bicarbonate and water, in the order given, then dried. The benzene is evaporated leaving an oil which is dissolved in hexane and the insoluble material removed by filtration. After evaporation of the hexane an almost quantitative yield of a solid is obtained. Upon crystallization the product melts at one hundred and thirty to one hundred and thirty-one degrees centigrade. Elemental analysis (theory: Cl, 30.3%, N, 6.0%; found: Cl, 30.2%, N, 5.8%) and infra-red analysis establishes the identity of the product as 3,4-dichloro-N-propionylphenylhydroxylamine.

*Example 2.—Preparation of 3,4-dichloro-N-isobutyrylphenylhydroxylamine*

Using the same procedure and reaction conditions described in detail in Example 1, the above named solid product melting at one hundred and twelve degrees centigrade is formed in good yield. Elemental analysis (theory: Cl, 28.6%, N, 5.7%; found: Cl, 28.7%, N, 5.3%) and infra-red analysis establish that 3,4-dichloro-N-isobutyrylphenylhydroxylamine, the desired product is formed.

*Example 3.—Preparation of 3,4-dichloro-N-methacrylylphenylhydroxylamine*

Using the same procedure and reaction conditions described in Example 1, the above named product is formed in good yield. The product is a solid melting at one hundred and six degrees centigrade, having the following elemental analysis:

Cl (theory): 28.9%; Cl (found): 28.9%.
N (theory): 5.7%; N (found): 5.7%.

*Example 4.—Evaluation of the compounds of this invention and related structures as herbicides*

Greenhouse tests of herbicidal activity are performed at an application rate of four pounds of active ingredient per acre as follows. The compound is dissolved in several parts by weight of a substantially non-phytotoxic mixture of xylene isophorone and a commercial polyoxyethylene-alkylaryl sulfonate mixture and the solution emulsified with water and sprayed on a population of seedlings of representative annual weeds, principally ragweed, lambsquarters and buttonweed, generally at one to three weeks after emergence. The ratings of weed kill are given in the last column of the table labeled "herbicidal activity," and are scaled from 0–10, 0 being no effect, and 10 being one hundred percent kill, the intermediate ratings being a visual estimate of percent weed kill. A rating under 7 is considered to be unsatisfactory. The results appear in the table below. Seedling ryegrass under these same test conditions was not seriously injured.

Table I

| Compound: | Herbicidal activity rating |
|---|---|
| 3,4 - dichloro - N - propionylphenylhydroxylamine | 10 |
| 3,4 - dichloro - N - isobutyrylphenylhydroxylamine | 9–10 |
| 3,4 - dichloro - N - methacrylylphenylhydroxylamine | 7–8 |
| 3,4 - dichlorophenylhydroxylamine | 0 |
| 4-chloro-N-acetylphenylhydroxylamine | 0–2 |
| 3,4-dichloro-N-acetylphenylhydroxylamine | 0 |
| 3,4-dichloro-N-octanoylphenylhydroxylamine | 0 |
| 3,4-dichloro-N-acrylylphenylhydroxylamine | 0 |
| 3,4-dimethyl-N-propionylphenylhydroxylamine | 0 |

*Example 5.—Evaluation of the compounds of this invention as selective herbicides*

Using the same techniques and conditions, concentrations (four pounds per acre), and rating system, given in Example 4, the compounds of this invention are tested in an area in which soybeans, cabbages, potatoes and tomatoes are growing. The compounds are rated in two respects, first as to the weed kill and the second as to injury to the foliage of the crop.

Table II

| Compound | Herbicidal Activity Rating | Damage to Vegetable Crops |
|---|---|---|
| 3,4-dichloro-N-propionylphenylhydroxylamine. | 10 | No significant damage. |
| 3,4-dichloro-N-isobutyrylphenylhydroxylamine. | 8–10 | Do. |
| 3,4-dichloro-N-methacrylylphenylhydroxylamine. | 7–8 | Do. |
| 3,4-dichloro-N-(2-methylpentanoyl)phenylhydroxylamine. | 7 | Do. |

While all of the compounds of this invention are effective herbicides, for reasons of economy and convenience among other things, the 3,4-dichloro-N-propionyl-, -N-isobutyryl- and -N-methacrylphenylhydroxylamines are more advantageous and are therefore the preferred embodiment of this invention.

We claim:

1. A 3,4-dihalo-N-acylphenylhydroxylamine of the structure:

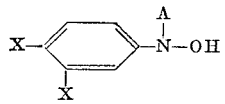

wherein X is a halogen and A is an aliphatic acyl radical selected from the group consisting of alkanoyl and alkenoyl of three to six carbon atoms, having at least one methyl group on the carbon atom adjacent to the carbonyl group.
2. 3,4-dichloro-N-propionylphenylhydroxylamine.
3. 3,4-dichloro-N-isobutyrylphenylhydroxylamine.
4. 3,4-dichloro-N-methacrylylphenylhydroxylamine.
5. 3,4 - dichloro - N - (2 - methylpentanoyl)phenylhydroxylamine.

References Cited by the Examiner
UNITED STATES PATENTS

| | | | |
|---|---|---|---|
| 2,732,403 | 1/1956 | Surrey | 260—562 |
| 2,769,838 | 11/1956 | Matter et al. | 260—562 |
| 3,020,142 | 2/1962 | Willard et al. | 71—2.3 |
| 3,037,058 | 5/1962 | Bluestone et al. | 167—42 X |
| 3,062,635 | 11/1962 | Acker et al. | 71—2.3 |

OTHER REFERENCES

Fischer et al.: German application 1,005,784, printed April 1957.

Huffman et al.: Jour. Agr. and Food Chem., vol. 8, pages 298–302 (1960).

Schäfer et al.: German application 1,039,779, printed September 1958.

Schome in "Chemical Abstracts," vol. 40, col. 7047 [7] (1940).

WALTER A. MODANCE, *Primary Examiner.*

MAURICE A. BRINDISI, JULIUS S. LEVITT, NICHOLAS, S. RIZZO, *Examiners.*

E. J. MEROS, JAMES O. THOMAS, R. PRICE, NATALIE TROUSOF, *Assistant Examiners.*